United States Patent

Naruse et al.

Patent Number: 5,411,074
Date of Patent: May 2, 1995

[54] METHOD OF CONTROLLING TEMPERATURE OF METALLIC MOLD IN PERMANENT MOLD CASTING FACILITY AND APPARATUS THEREFOR

[75] Inventors: Eiji Naruse; Tadashi Nishida, both of Toyokawa, Japan

[73] Assignee: Sintokogio Ltd., Nagoya, Japan

[21] Appl. No.: 125,873

[22] Filed: Sep. 24, 1993

[30] Foreign Application Priority Data

Oct. 23, 1992 [JP] Japan .................................. 4-309260

[51] Int. Cl.$^6$ .............................................. B22D 46/00
[52] U.S. Cl. .................... 164/4.1; 164/151.4; 164/154.6
[58] Field of Search ............. 164/4.1, 458, 154.1, 164/154.6, 155.1, 155.6, 151.4

[56] References Cited

U.S. PATENT DOCUMENTS 3,630,707 12/1971 Ayers ........................................ 65/162

FOREIGN PATENT DOCUMENTS

| | | |
|---|---|---|
| 0015530 | 9/1980 | European Pat. Off. . |
| 286977A2 | 10/1988 | European Pat. Off. ............ 164/458 |
| 1956603 | 6/1970 | Germany . |
| 2026270 | 12/1970 | Germany . |
| 3541445A1 | 6/1987 | Germany . |
| 60-199562 | 10/1985 | Japan ................................ 164/154.6 |
| 62-50217 | 10/1987 | Japan . |
| 63-101062 | 5/1988 | Japan . |
| 2246532A | 2/1992 | United Kingdom ................. 164/4.1 |

Primary Examiner—P. Austin Bradley
Assistant Examiner—Jeffrey T. Knapp
Attorney, Agent, or Firm—Nikaido, Marmelstein Murray & Oram

[57] ABSTRACT

An image of the separating plane of each of mold pieces of a metallic mold is picked up by a infrared vidicon camera before the mold pieces are closed together. That image is then processed so as to obtain a temperature distribution pattern which is in turn compared with a target temperature distribution pattern previously stored in memory. With the result of the comparison, the mold piece is cooled or heated so as to have the target temperature pattern before the mold pieces are closed together.

9 Claims, 2 Drawing Sheets

METHOD OF CONTROLLING TEMPERATURE OF METALLIC MOLD IN PERMANENT MOLD CASTING FACILITY AND APPARATUS THEREFOR

BACKGROUND OF THE INVENTION

1. Field of the Invention

The present invention relates to a method of and an apparatus for controlling the temperature of a metallic mold, which is suitable for cooling and heating a metallic mold in a permanent mold casting facility so as to control the temperature of mold pieces at a required temperature.

2. Description of the Related Art

Conventionally, the control of the temperature of a metallic mold in a permanent mold casting facility has been in general made in such a way that the temperature of the metallic mold is measured while cooling water is circulated therethrough on the rear side thereof so as to cool the metallic mold which has been heated during casting, down to a required temperature. Further, the measurement of the temperature of a metallic mold has been conventionally made with the use of thermocouples as temperature sensors embedded in the metallic mold.

However, the position of attachment of the thermocouples in the metallic mold has been restricted while the contact between the detecting parts of the thermocouples and the metallic mold is insufficient, and the responsiveness of the thermocouples is low. Thus, there has been raised a problem such that the control of the temperature of the metallic mold becomes inaccurate.

SUMMARY OF THE INVENTION

The present invention is devised in view of the above-mentioned problems, and accordingly, one object of the present invention is to provide a control method and an apparatus with which the temperature of a metallic mold in a permanent mold casting facility can approach a required temperature.

To the end, according to the first aspect of the present invention, there is provided a method of controlling the temperature of a metallic mold including a plurality of mold pieces which can be opened at their separating planes, at a required temperature before casting, comprising the steps of opening the plurality of mold pieces, picking up an image of the separating plane of at least one of the mold pieces with the use of an infrared vidicon camera so as to obtain an image signal, processing the image signal so as to detect a temperature distribution pattern of the separating plane of the mold piece, comparing the detected temperature pattern with a preset target temperature distribution pattern of the separating plane of the mold piece corresponding to the above-mentioned required temperature of the metallic mold, and cooling or heating mold piece in accordance with the result of the comparison.

Further, according to a second aspect of the present invention, there is provided an apparatus for controlling the temperature of a metallic mold at a required temperature before casting, in a permanent mold casting facility, the metallic mold being composed of a plurality of mold pieces which can be opened at their separating planes, comprising an infrared vidicon camera means for picking up an image of the separating plane of at least one of the plurality of mold pieces which have been opened, so as to obtain an image signal, an image processing means for processing the image signal so as to detect a temperature distribution pattern of the separating plane of the mold piece, a memory means for storing therein a target temperature distribution pattern of the separating plane of the mold piece corresponding to the required temperature, a means for comparing the temperature distribution pattern detected by the image processing means with the target temperature distribution pattern stored in the memory means so as to decide whether the cooling or heating of the mold piece is required or not, and a means for cooling or heating the mold piece in accordance with a signal from the decision means.

Other and further objects, features and advantages of the invention will become apparent from the following description of an embodiment with reference to the accompanying drawings, in which:

DESCRIPTION OF THE PREFERRED EMBODIMENTS

Figure 1:
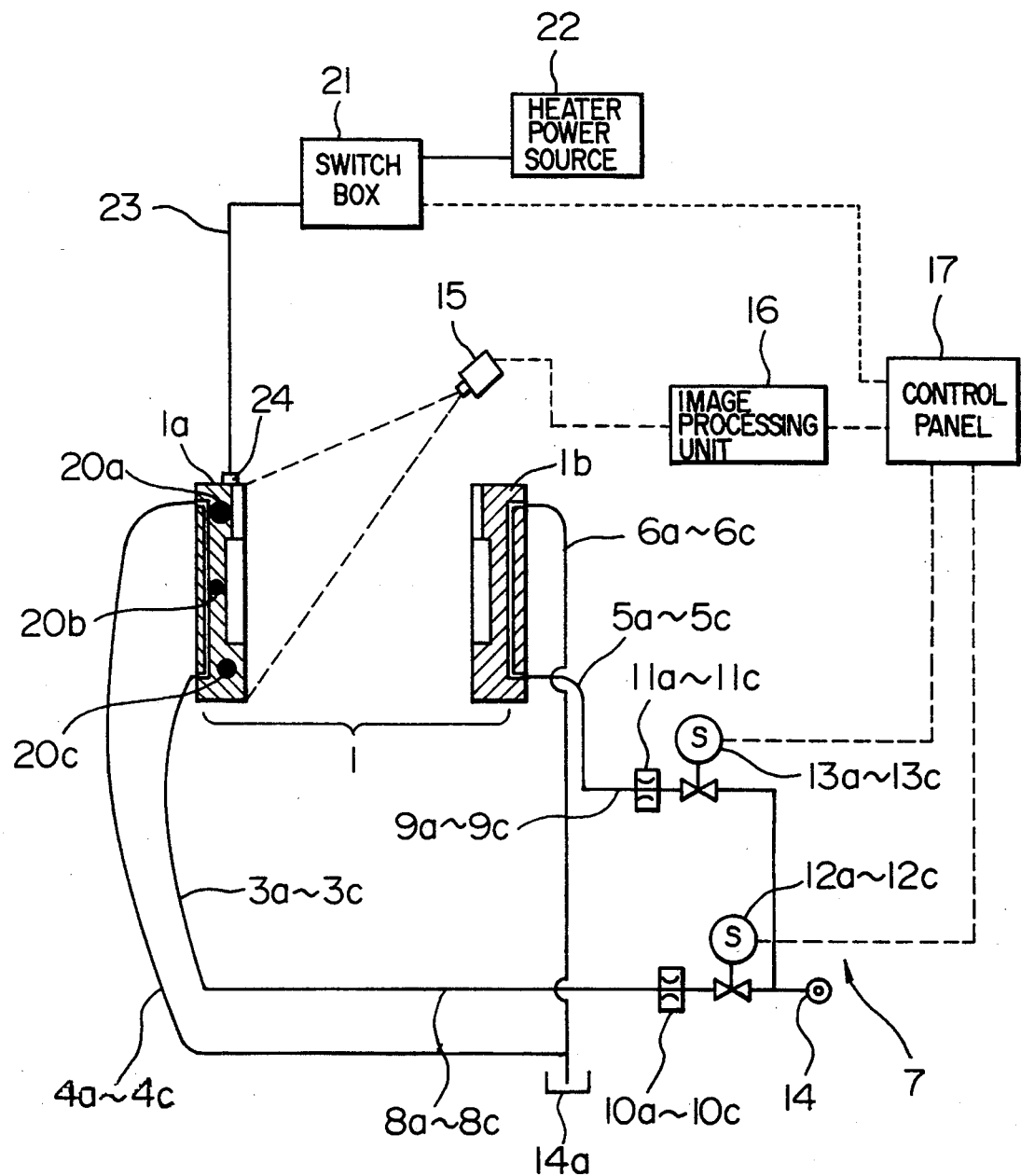
FIG. 1 is a schematic view illustrating an embodiment of the present invention.
Figure 2:
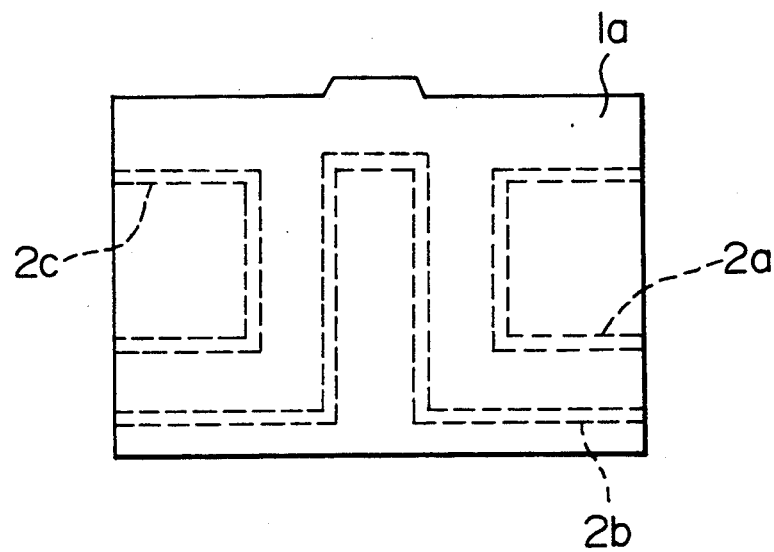
FIG. 2 is a rear view illustrating a mold piece used in the embodiment shown in FIG. 1.
Figure 3:
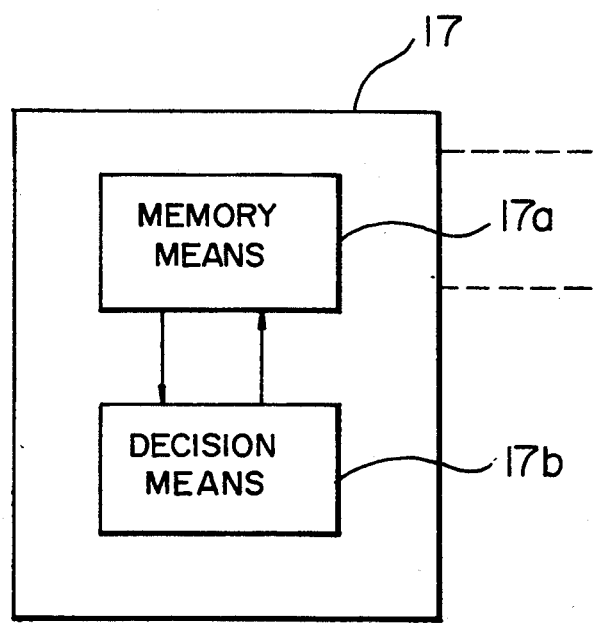
FIG. 3 is a block diagram showing a control panel used in the embodiment shown in FIG. 1.

Next, explanation will be made of an embodiment of the present invention with reference to the drawings. Referring to FIG. 1 which is a schematic view, a vertically splitable metallic mold 1 is composed of mold pieces 1a, 1b which can be opened and closed by a mold opening and closing device which is not shown. Further, as shown in FIG. 2 which is a rear view showing the mold piece 1a, through-holes 2a, 2b, 2c are formed in the rear surface of the mold piece 1a, and similar through-holes 2a, 2b, 2c are formed in the rear surface of the other mold piece 1b. These through-holes 2a, 2b, 2c are connected at their opposing ends to a cooling mechanism 7 which includes rubber hoses 3a to 3c, 4a to 4c, 5a to 5c, 6a to 6c, as shown in FIG. 1. At the ends of rubber hoses 4a to 4c, 6a to 6c, an exhaust tank 14a is provided. In the cooling mechanism 7, pipe lines 8a to 8c, 9a to 9c which are connected at one end, respectively, to the rubber hoses 3a to 3c, 5a to 5c, are connected at the other end to a water source 14 through the intermediary of restrictor valves 10a to 10c, 11a to 11c and solenoid shut-off valves 12a to 12c, 13a to 13c. The solenoid shut-off valves 12a to 12c, 13a to 13c are selectively operated so as to circulate cooling water through those of the through-holes 2a to 2c, 2a to 2c in the mold pieces 1a, 1b, which correspond to the selected solenoid shut-off valves, and accordingly, mold pieces 1a, 1b are cooled at required positions.

Further, an infrared vidicon camera 15 which picks up an infrared image, is located at a position where the infrared vidicon camera 15 can pick up infrared rays radiated from the separating plane of the mold piece 1a which has been opened. The infrared vidicon camera 15 is electrically connected to an image processing unit 16 which receives an image signal from the infrared vidicon camera 15 so as to detect a temperature distribution pattern on the separating plane of the mold piece 1a. An infrared vidicon camera 15 (not shown) and an image processing unit 16 (not shown) similar to those mentioned above, are also provided for the other mold piece 1b.

Further, the image processing units 16, 16 are connected electrically to a control panel 17 which is provided therein with a microcomputer including a memory means 17a for storing therein a target temperature pattern relating to the mold pieces 1a, 1b, and a decision means 17b for comparing a measured temperature distribution pattern detected by the image processing units 16, 16, with the target temperature distribution pattern previously set so as to decide whether or not the cooling is required for the separating planes of the mold pieces 1a, 1b. Further, the control panel 17 is connected electrically to the above-mentioned solenoid shut-off valves 12a to 12c, 13a to 13c.

Further, each of the mold pieces 1a, 1b is incorporated therein with electric heaters 20a to 20c (which are shown only on the mold piece 1a side in FIG. 1). These electrical heaters 20a to 20c are connected to a switch box (containing switches) 21, through cable cords 23, 23. The switch box 21 is in turn connected to a heater power source 22 so as to supply power to the electric heaters 20a to 20c in response to instruction signals from the control panel 17.

Next, explanation will be made of the operation of the apparatus in this embodiment.

After the metallic mold 1 is set in its open condition, power is applied to electric heaters 20a to 20c so as to heat the mold pieces 1a, 1b. The infrared vidicon cameras 15, 15 (only one of them is shown in FIG. 1) pick up infrared images on the separating planes of the mold pieces 1a, 1b, and deliver image signals to the image processing units 16, 16 which then deliver measured temperature distribution patterns on the separating planes of the mold pieces 1a, 1b to the control panel 17. Accordingly, the measured temperature distribution patterns are compared with the target temperature distribution pattern which have been previously set and stored. In this target temperature distribution pattern, the temperature of parts around a trough part and a crest part on the separating plane of a mold piece is set in a predetermined range (for example, 100 to 120 deg. C.), and the temperature of a part along the outer periphery of the separating plane is set at a predetermined value (for example, 100 deg. C.). If the measured temperature distribution pattern is shifted from the target temperature distribution pattern, the control panel 17 delivers instruction signals for controlling the supply of power to the electric heaters 20a to 20c to the switch box 21 so that the supply of power to the electric heaters 20a to 20c are controlled. Accordingly, the measured temperature distribution pattern of the separating plane of each of the mold pieces 1a, 1b is adjusted so as to coincide with the target temperature distribution pattern.

Next, the mold pieces 1a, 1b are closed, a first casting step is initiated, and accordingly the mold pieces 1a, 1b have a high temperature since the temperature of the casting is high. After the completion of the casting, the mold pieces 1a, 1b are opened for removing the thus cast product from the metallic mold.

Then, a second casting step and steps subsequent thereto are carried out. Before casting, the infrared vidicon cameras 15, 15 pick up infrared images of the separating plane of the mold pieces 1a, 1b which are then processed by the image processing units 16, 16 so as to obtain measured temperature distribution patterns of the separating planes of the mold pieces 1a, 1b. Since the separating planes of the mold pieces 1a, 1b are heated up to a high temperature through the first heating step so that they radiate infrared rays which give spectra in dependence upon the temperature distributions over the separating planes of the mold pieces. The measured temperature distribution patterns can be obtained from these spectra.

Then, the measured temperature distribution patterns are delivered to the control panel 17 so as to be compared with the target temperature distribution pattern which has been previously set and stored in memory. Accordingly, of the solenoid shut-off valves 12a to 12c, 13a to 13c in the above-mentioned cooling mechanism 7, those selected are opened so that cooling water is supplied to the through-holes 2a to 2c, 2a to 2c in the mold pieces 1a, 1b, selectively. The fed cooling water circulates through the through-holes 2a to 2c, 2a to 2c, selectively so as to cool necessary parts of the mold pieces 1a, 1b. Accordingly, the temperature of the mold pieces 1a, 1b is controlled desirably as a whole.

Although the preferred embodiment of the present invention in which the electric heaters 20a to 20c are incorporated in each of the mold pieces 1a, 1b, has been explained hereinbefore, heaters other than the electric heaters may be used for heating the mold pieces. Further, the number of the through-holes 2a to 2c, 2a to 2c formed in the mold pieces 1a, 1b and the number of the solenoid valves 12a to 12c, 13a to 13c may be increased so as to finely control the temperature of the mold pieces. Moreover, it is possible that either one of the mold pieces may be cooled and the other one of them may be heated. Further, a mold composed of more than two mold pieces may be included within the scope of the present invention.

As clear from the foregoing description, according to the present invention, the infrared vidicon camera picks up an image of the separating plane of a mold piece which is then processed by the image processing unit so as to detect the temperature distribution pattern of the separating plane of the mold piece, and the measured temperature distribution pattern thus detected is then compared with the target temperature distribution pattern which has been previously set so that the mold piece is heated or cooled in accordance with the result of the comparison. Thus, the apparatus according to the present invention can precisely and easily detect the temperature distribution of the separating plane of the mold piece in a short time in comparison with the conventional apparatus using thermocouples. Further, the mold piece can be cooled or heated so as to allow the temperature of the mold to approach a desired temperature.

What is claimed is:

1. A method of controlling the temperature of a metallic mold, comprising a plurality of mold pieces which can be opened at their separating planes, at a fixed temperature before casting, comprising the steps of:
   bringing said plurality of mold pieces to their operating temperature;
   opening at least one of said mold pieces at said operating temperature along its hot separating plane;
   viewing said hot separating plane with an infra-red vidicon camera so as to pick up an image of said hot separating plane of at least one of said plurality of mold pieces;
   delivering an image signal from said camera;

processing said image signal so as to detect a temperature distribution pattern on said hot separating plane of said mold piece;

comparing said detected temperature distribution pattern with a target temperature distribution pattern of said separating plane of said mold piece, said desired temperature distribution pattern having been previously set to correspond to said desired temperature and temperature distribution of said metallic mold; and adjusting the temperature of said mold piece in accordance with the comparison to reduce differences between said temperature distribution pattern and said target temperature distribution pattern.

2. A method of controlling the temperature of a mold as set forth in claim 1, wherein cooling water is fed so as to cool said metallic mold.

3. A method of controlling the temperature of a metallic mold as set forth in claim 1, further comprising the step of picking up images of the separating plane of said plurality of mold pieces by a plurality of infrared vidicon cameras, respectively and simultaneously.

4. A method of controlling the temperature of a metallic mold as set forth in claim 1, wherein said metallic mold is heated by applying voltage to electric heaters incorporated in said plurality of mold pieces.

5. An apparatus for controlling the temperature of a metallic mold comprising a plurality of mold pieces which are openable at their separating planes, at a desired temperature before casting;

infrared vidicon camera means for picking up an image of said separating plane of at least one of said plurality of said mold pieces;

means to deliver an image signal from said camera;

an image processing means for processing said image signal so as to detect a temperature distribution pattern on said separating plane of said mold piece;

means for previously establishing a target temperature distribution pattern corresponding to said target temperature of said metallic mold;

memory means for storing therein a target temperature distribution pattern for said separating plane of said mold piece;

means for comparing said temperature distribution pattern detected by said image processing means, with said target temperature distribution pattern stored in said memory means;

means to decide whether the temperature of said mold piece is required to be adjusted; and a means for adjusting the temperature of said mold piece in accordance with a signal from said decision means.

6. A control apparatus as set forth in claim 5, wherein said mold pieces contain electric heaters incorporated therein.

7. A control apparatus as set forth in claim 5, wherein said infrared vidicon camera means comprises a plurality of vidicon cameras for simultaneously picking up images of said separating planes of said plurality of mold pieces.

8. A control apparatus as set forth in claim 5, wherein said mold piece comprises a rear surface with through-holes through which cooling water passes.

9. A control apparatus as set forth in claim 8, wherein said means for cooling said mold piece includes a means for feeding cooling water through said through-holes.

* * * * *